Oct. 31, 1933.  E. MROSS  1,932,747
FOOD MIXER SUPPORT
Filed May 23, 1932
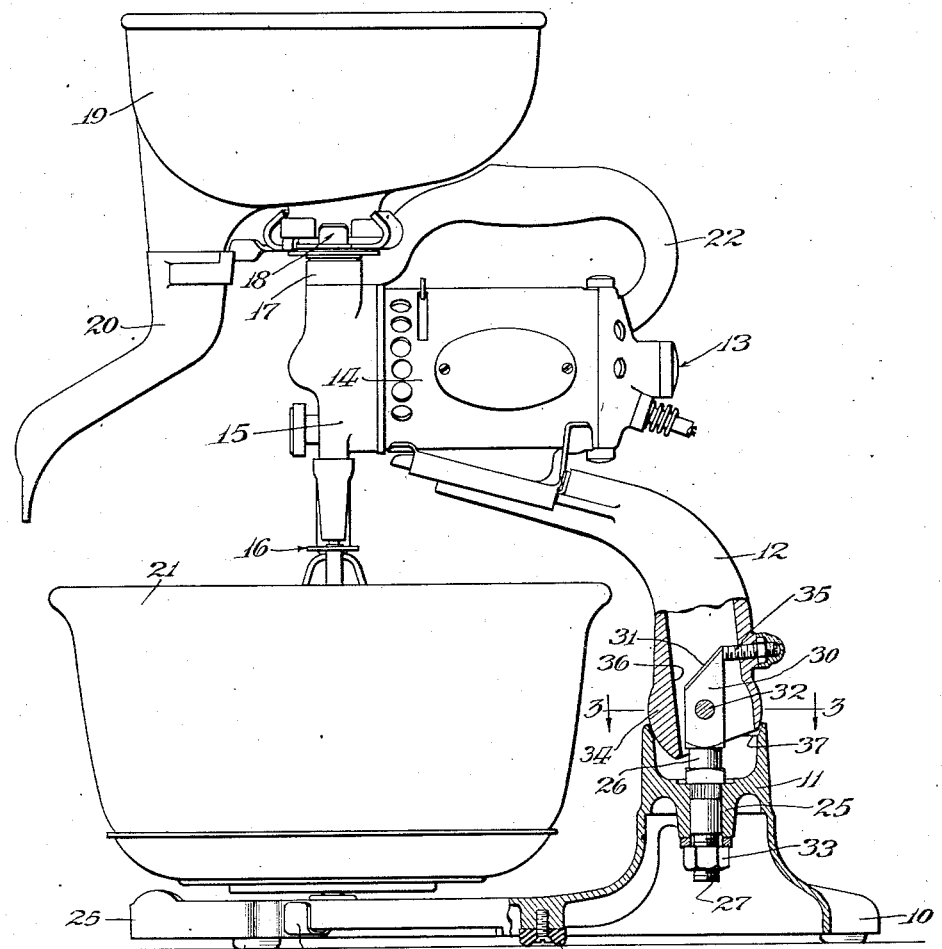
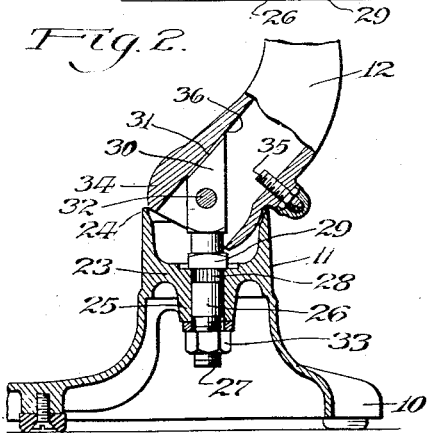
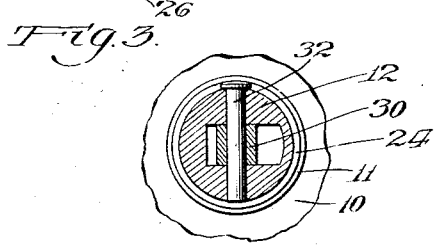
Inventor:
Edward Mross,
By Bertha L. MacGregor
Attorney Patented Oct. 31, 1933

1,932,747

UNITED STATES PATENT OFFICE 1,932,747

FOOD MIXER SUPPORT

Edward Mross, Racine, Wis., assignor to Hamilton Beach Manufacturing Company, Racine, Wis., a corporation of Wisconsin Application May 23, 1932. Serial No. 612,882

9 Claims. (Cl. 248—15)

This invention relates to a support, particularly adapted for supporting a motor driven food mixer.

One object of the invention is to produce a support which is attractive in appearance, and efficient for its intended purpose.

Another object is to provide a pivotal connection between the base of the support and the mixer-supporting arm, which permits limited movement of the arm to carry the mixer into an inoperative position and includes means for adjusting the position of the arm for holding the mixer in proper operative position relatively to the mixing bowl.

In the drawing:—

Fig. 1 is a side elevation, partly in section, of a support embodying my invention, together with a food mixer in position thereon.

Fig. 2 is a fragmentary view of the support, partly in section, showing the supporting arm in pivoted position.

Fig. 3 is a sectional view taken on the line 3—3 of Fig. 1.

As illustrative of the device in which is embodied the invention sought to be protected by this application, I have shown in Fig. 1 a combination food mixer and juice extractor, in which the horizontally disposed base is indicated at 10, an upright socket, integral with the base, at 11, a pivotally mounted arm at 12, and a motor-driven food mixer, detachably mounted on the arm, at 13. The food mixer comprises a motor 14, carrying a gear casing 15, and a detachable agitator or beater unit 16. The motor is operatively connected with the agitators beneath the gear casing and with the juice extractor above the gear casing. The gear casing 15 is provided with a socket 17 which receives the coupling which operatively and removably connects the reamer drive shaft to a driven shaft in the gear casing. The reamer drive shaft and coupling carry the supporting and clamping device 18 for the bowl 19. The bowl is provided with a spout 20. The food mixer bowl is indicated at 21, and a handle on the motor, at 22.

It will be understood that the invention herein shown, described and claimed may be embodied in food mixers of various constructions, and is not limited to the particular combination in which it is illustrated herein, in Fig. 1.

Novel features of construction of the combination food mixer and juice extractor, not claimed herein, are the subject of applications co-pending herewith.

Referring now to that part of the construction which is the subject of this invention, the base 10 and socket 11 are preferably integrally cast or otherwise formed. A centrally apertured web 23 extends internally across the socket member 11, below its upper edge 24, and provides a bearing 25 for a bolt 26. The bolt 26 is screw threaded at its lower end 27 and has a roughened or scored surface 28 below the nut 29 which is fixed to the bolt. The nut 29 forms a shoulder which rests on the upper surface of the web 23. Fixed on the upper end of the bolt 26 is a block 30, having a beveled face 31, and horizontally apertured to receive a pivot pin 32.

The bolt 26, carrying the nut 29 and block 30, is forced down through the hole in the bearing 25, the scored part 28 preventing easy turning of the bolt in the bearing, and then the nut 33 is applied to the threaded end 27. In positioning the bolt 26 in the bearing 25, the bolt is so placed and fastened in position by the nut 27, that the beveled face 31 of the block 30 will be forwardly directed as shown.

The arm 12 is preferably made of cast metal, in hollow tubular form, terminating at its lower end in an externally spherical member 34 having its lower end cut off. An adjusting screw 35 extends through the rear wall of the arm 12, just above the spherical portion 34. When the arm 12 has been mounted on the pivot pin 32, the pin extending through the arm walls 12 and block 30, the end of the screw 35 is adapted to bear on the rearward side of the block 30, as shown in Fig. 1, for limiting the forward movement of the arm 12. The screw 35 can be adjusted to bring the bottom of the agitator unit 16 into the exact position desired for efficient mixing of the contents of the bowl 21.

When it is desired to tilt the arm 12 rearwardly on the socket 11 to move the mixer 13 and agitator unit 16 away from the bowl 21, the arm 12 may be manually pivoted on the pin 32 into the position shown in Fig. 2, the inner surface 36 of the forward side of the arm 12 bearing on the beveled face 31. This construction provides an effective stop for the rearward movement of the arm 12 and the parts supported thereby,—a stop which is rigid and strong and which provides a sufficently large bearing surface to obviate wear.

The inner surface of the wall of the socket member 11 is beveled adjacent its upper edge, as indicated at 37 for accommodating the spherical end 34 of the arm 12 in its various positions and to provide a relatively close fit between the part 34 and the socket 11. The lower edge of the arm 12 is at all times below the top edge of the socket 11, whereby the pleasing appearance of the support, as a whole, is maintained when the arm and mixer are in either of their intended positions.

Changes may be made in details of construction without departing from the scope of my invention and I do not intend to be limited to the exact form shown and described, except as set forth in the appended claims.

I claim:—

1. A support comprising a base, an open top socket rising from the base, a vertically disposed bolt mounted in the socket, a pivot pin extending through said bolt, and a hollow tubular arm, terminating in a spherical lower end, mounted on the pin and having its spherical end located partly within the socket walls, said arm being pivotally movable relatively to the socket.

2. A support comprising a base, an open top socket rising from the base, a vertically disposed bolt mounted in the socket, a pivot pin extending through said bolt, and a hollow tubular arm mounted on the pin and adapted to bear internally on said bolt when the arm has reached the limit of one of its pivotal movements.

3. A support comprising a base, an open top socket rising from the base, a vertically disposed bolt mounted in the socket, a pivot pin extending through said bolt, and a hollow tubular arm mounted on the pin and adapted to bear internally on said bolt when the arm has reached the limit of one of its pivotal movements, the lower end of the arm being spherical in shape and located partly within the socket walls.

4. A support comprising a horizontally disposed base, an upright member rising from the base, a vertically disposed bolt mounted in the upright member, said bolt having a beveled face on its upper end, a pivot pin extending through said bolt, and a hollow arm pivotally mounted on said pin and adapted to bear internally on said beveled face when the arm has reached the limit of one of its pivotal movements.

5. A support comprising a base, an open top socket rising from the base, a vertically disposed bolt mounted in the socket, a hollow tubular arm mounted on the bolt and adapted to bear internally on said bolt when the arm has reached the limit of one of its pivotal movements, and an adjusting screw extending through the wall of the arm and adapted to bear on the bolt when the arm has reached the limit of its pivotal movement in the opposite direction.

6. A support comprising a horizontally disposed base, an upright member rising from the base, a vertically disposed bolt mounted in the upright member, said bolt having a beveled face on its upper end, a pivot pin extending through said bolt, a hollow arm pivotally mounted on said pin and adapted to bear internally on said beveled face when the arm has reached the limit of one of its pivotal movements, and an adjusting screw extending through the wall of the arm and adapted to bear on the bolt when the arm has reached the limit of its pivotal movement in the opposite direction.

7. A support comprising an integral base and socket rising from the base, the socket having a horizontal web, centrally apertured, located below the upper edge of the socket, a bolt located in the apertured web and protruding upwardly above the socket wall, a pivot pin extending through the bolt, a hollow tubular arm pivotally mounted on the pin and extending downwardly into the socket, and means for limiting the pivotal movement of the arm in opposite directions.

8. A support comprising an integral base and socket rising from the base, the socket having a horizontal web, centrally apertured, located below the upper edge of the socket, a bolt located in the apertured web and protruding upwardly above the socket wall, a hollow tubular arm pivotally mounted on the bolt and extending downwardly into the socket, and means for limiting the pivotal movement of the arm in opposite directions, said means comprising a beveled face on the bolt and an adjusting screw extending through the arm wall.

9. A food mixer support comprising a base, an upright member on the base, a vertically disposed bolt mounted in the upright member, a pivot pin extending through said bolt, and a motor-carrying arm mounted on the pin and pivotally movable relatively to the upright member, said bolt extending upwardly into the interior of the arm and bearing on the arm at the end of the pivotal movement of the arm.

EDWARD MROSS.